US011888887B2

(12) United States Patent
Roytman et al.

(10) Patent No.: US 11,888,887 B2
(45) Date of Patent: Jan. 30, 2024

(54) RISK-BASED VULNERABILITY REMEDIATION TIMEFRAME RECOMMENDATIONS

(71) Applicant: Kenna Security LLC, Chicago, IL (US)

(72) Inventors: Michael Roytman, Chicago, IL (US); Edward T. Bellis, Evanston, IL (US); Jason Rolleston, San Jose, CA (US)

(*) Notice: Subject to any disclaimer, the term of this patent is extended or adjusted under 35 U.S.C. 154(b) by 301 days.

(21) Appl. No.: 17/241,952

(22) Filed: Apr. 27, 2021

(65) Prior Publication Data

US 2021/0336984 A1 Oct. 28, 2021

Related U.S. Application Data

(60) Provisional application No. 63/016,187, filed on Apr. 27, 2020.

(51) Int. Cl.
*H04L 9/40* (2022.01)

(52) U.S. Cl.
CPC ...... *H04L 63/1433* (2013.01); *H04L 63/1466* (2013.01)

(58) Field of Classification Search
CPC ............... H04L 63/1433; H04L 63/1466
See application file for complete search history.

(56) References Cited

U.S. PATENT DOCUMENTS

| | | | | |
|---|---|---|---|---|
| 8,966,639 | B1* | 2/2015 | Roytman | H04L 63/1433 726/25 |
| 10,050,999 | B1* | 8/2018 | Rossman | H04L 63/1416 |
| 10,410,158 | B1* | 9/2019 | Yumer | G06N 20/00 |
| 11,503,064 | B1* | 11/2022 | Aloisio | H04L 41/142 |
| 2015/0237062 | A1* | 8/2015 | Roytman | H04L 63/1433 726/25 |
| 2015/0237065 | A1* | 8/2015 | Roytman | H04L 63/1433 726/25 |
| 2016/0255115 | A1* | 9/2016 | Mital | H04L 63/20 726/1 |
| 2017/0061132 | A1* | 3/2017 | Hovor | H04L 63/1433 |
| 2018/0351987 | A1* | 12/2018 | Patel | G06F 21/577 |
| 2019/0166155 | A1* | 5/2019 | Steele | H04L 63/1433 |
| 2019/0245881 | A1* | 8/2019 | Ward | H04L 63/1433 |
| 2019/0289029 | A1* | 9/2019 | Chawla | H04L 63/1425 |
| 2019/0362078 | A1* | 11/2019 | Inagaki | G06F 3/04817 |

(Continued)

*Primary Examiner* — Stephen T Gundry
(74) *Attorney, Agent, or Firm* — Baker Botts L.L.P.

(57) ABSTRACT

Systems and methods for computing times to remediate for asset vulnerabilities are described herein. In an embodiment, a server computer receives first vulnerability data for a plurality of entities identifying asset vulnerabilities and timing data corresponding to the vulnerability data indicating an amount of time between identification of an asset vulnerability and a result of the asset vulnerability. The server computer identifies a strict subset of the first vulnerability data that belongs to a particular category of a first plurality of categories. The server computer receives second vulnerability data for a particular entity identifying asset vulnerabilities. The server computer identifies a strict subset of the second vulnerability data the belongs to the particular category. Based, at least in part, on the strict subset of the first vulnerability data, the server computer computes a time to remediate the asset vulnerabilities in the strict subset of the second vulnerability data.

20 Claims, 5 Drawing Sheets

(56) References Cited

U.S. PATENT DOCUMENTS

| | | | |
|---|---|---|---|
| 2020/0162497 A1* | 5/2020 | Iyer | H04L 63/164 |
| 2020/0236129 A1* | 7/2020 | Barkovic | H04L 43/045 |
| 2020/0311630 A1* | 10/2020 | Risoldi | G06F 3/0482 |
| 2020/0366706 A1* | 11/2020 | Sexton | H04L 63/1425 |
| 2021/0019135 A1* | 1/2021 | Hwang | G06F 9/4881 |
| 2021/0203673 A1* | 7/2021 | dos Santos | H04L 41/0609 |
| 2021/0243217 A1* | 8/2021 | Stelmar Netto | H04L 63/1466 |
| 2022/0035929 A1* | 2/2022 | Hicks | G06F 11/3692 |
| 2022/0368702 A1* | 11/2022 | Robbins | H04L 63/1416 |
| 2022/0368717 A1* | 11/2022 | Mylavarapu | H04L 63/1433 |
| 2022/0377093 A1* | 11/2022 | Crabtree | H04L 43/045 |
| 2022/0400130 A1* | 12/2022 | Kapoor | G06F 16/9537 |
| 2023/0008173 A1* | 1/2023 | Crabtree | H04L 63/1441 |
| 2023/0019941 A1* | 1/2023 | Doyle | G06F 8/77 |
| 2023/0033317 A1* | 2/2023 | Lin | H04L 63/1433 |
| 2023/0070546 A1* | 3/2023 | Mosby | G06F 21/577 |
| 2023/0075355 A1* | 3/2023 | Twigg | H04L 67/306 |
| 2023/0118388 A1* | 4/2023 | Crabtree | H04L 63/123 |
| | | | 726/23 |

* cited by examiner

Interface 400

Selection Options 402

Select Risk Tolerance

[ Low ]  [ Medium ]  [ High ]

Chart 404

| Asset Name | Subdivision A Value | Subdivision B Value | Remediation Time |
|---|---|---|---|
| Phone 1 | 1 | 3 | 67 days |
| Laptop 1 | 2 | 1 | 28 days |
| Phone 2 | 1 | 2 | 60 days |
| Server 1 | 3 | 2 | 17 days |
| Register 1 | 1 | 3 | 67 days |
| Phone 3 | 1 | 1 | 45 days |
| Laptop 2 | 2 | 2 | 37 days |

RISK-BASED VULNERABILITY REMEDIATION TIMEFRAME RECOMMENDATIONS

BENEFIT CLAIM

This application claims the benefit of Provisional Application 63/016,187, filed Apr. 27, 2020, the entire contents of which is hereby incorporated by reference as if fully set forth herein, under 35 U.S.C. § 119(e).

FIELD OF THE INVENTION

The present disclosure relates to security of computing devices. More specifically, the present disclosure relates to techniques for tracking vulnerabilities in networked environments.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Software vulnerabilities are weaknesses or flaws in computational logic. As used herein, the term "software" also refers to firmware. When exploited, a vulnerability can facilitate unauthorized access to a computing device, enable an attack to remain undetected, permit unauthorized modification of data, reduce the availability of data, and/or the like. An attempt to exploit or take advantage of a vulnerability is referred to herein as an attack, and a successful attack results in what is hereinafter referred to as a breach.

Often, programs are developed to exploit vulnerabilities. Such programs are referred to herein as exploits. For example, a particular vulnerability affecting Linux kernel versions through 3.14.5 failed to ensure that system calls had two different futex addresses. An exploit known as Towelroot took advantage of this vulnerability to gain root access to Android devices.

Vulnerabilities can be remediated using patches, version upgrades, and/or the like. Due to resource constraints, however, not all vulnerabilities can be remediated at the same time. Thus, remediation of vulnerabilities is typically prioritized according to different levels of risk posed by different vulnerabilities. For example, some vulnerabilities may never have exploits developed for them, and some exploits may never be used in an attack.

Determining how to prioritize vulnerabilities can be a difficult but important task. Service level agreements (SLAs) may be developed for networked environments which indicate a time by which individual vulnerabilities should be remediated. The determination of how to prioritize vulnerabilities has historically been a straightforward determination based on the severity of the vulnerability, with vulnerabilities with a high severity all being assigned a same time to remediate.

The static manner of determining times to remediate has a few major defects. First, the determination does not take into account differences in devices, priority levels of devices, risk tolerance of a company, likelihood of exploitation, or other security controls that are in place to prevent or limit the likelihood of exploitation. This lack of accounting for risk as a part of the timeframe in which a vulnerability will be remediated generates suboptimal remediation practices, as high-risk vulnerabilities are remediated more slowly as a result. In turn, remediating a high risk vulnerability slowly creates a time period of exposure for the enterprise following the guidance, increasing their overall risk posture. As a practical example, a vulnerability in a software program on a machine that has limited external network access is less likely to be exploited in an attack as the same vulnerability in a software program on a machine that has full internet access with no added security measures. As another example, a larger or more mature entity may be more risk tolerant, thus only needing times to remediate that are faster than the speed at which the vulnerability will be exploited while a smaller, more risk averse entity may need times to remediate that are faster than their peers.

A second issue with the static manner of determining times to remediate is that it is not responsive to changes in remediation or exploitation of vulnerabilities by others. When vulnerabilities begin being exploited faster, especially in the highest severity category, a statically defined time to remediate will be unable to adapt. Additionally, as other networked entities begin remediating vulnerabilities faster than the recommendations provided through the static method, the static score will slowly become outdated and will be unable to provide useful guidance for timing of vulnerability remediation. Static timeframes may be weeks or months long, and changes to the determination within the timeframe may invalidate the original determination.

Thus, there is a need for an adaptable means for computing a time to remediate for asset vulnerabilities that provides precision recommendations based on factors aside from the severity of the asset vulnerability.

SUMMARY

The appended claims may serve as a summary of the disclosure.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

General Overview

Systems and methods for identifying times to remediate for a plurality of different asset vulnerabilities are described herein. In an embodiment, a server computer stores first vulnerability data for a plurality of networked environments, the first vulnerability data identifying a plurality of asset vulnerabilities, an amount of time between discovery of the asset vulnerabilities and resolution through remediation or exploitation in an attack, and one or more features of the asset vulnerabilities, such as a risk score or priority assigned to the asset. The server computer generates a plurality of categories of vulnerabilities and computes a time to remediate for each category based on the resolution time in the first vulnerability data for the plurality of networked environments. The server computer is then able to categorize asset vulnerabilities in second vulnerability data corresponding to a particular networked environment and assign the computed time to remediate for each category to each asset vulnerability in said category. Embodiments may also include generating the categories using a plurality of different factors and/or computing the times to remediate using different metrics corresponding to different levels of risk.

In an embodiment, a method comprises receiving first vulnerability data for a plurality of entities identifying asset vulnerabilities and timing data corresponding to the vulnerability data indicating an amount of time between identification of an asset vulnerability and a result of the asset vulnerability; identifying a strict subset of the first vulnerability data that belongs to a particular category of a first plurality of categories; receiving second vulnerability data for a particular entity identifying asset vulnerabilities; identifying a strict subset of the second vulnerability data the belongs to the particular category; based, at least in part, on the strict subset of the first vulnerability data, computing a time to remediate the asset vulnerabilities in the strict subset of the second vulnerability data.

System Overview

Figure 1:
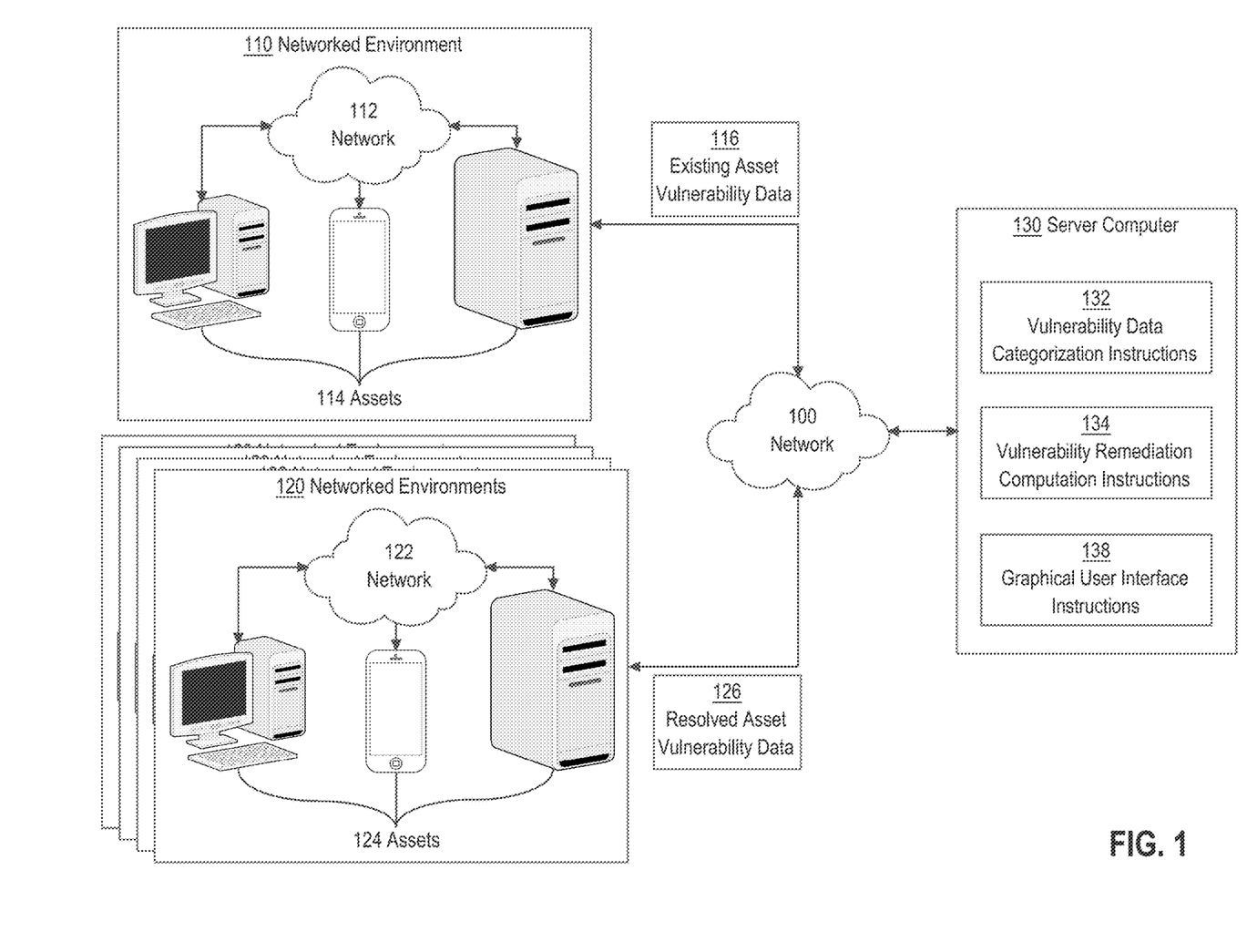
FIG. 1 depicts an overview of an asset remediation system.

FIG. 1 depicts an overview of an asset remediation system. FIG. 1 depicts a plurality of networked environments 120 and a networked environment 110 communicating with a server computer 130 over network 100. FIG. 1 depicts a simplified communication system where individual networked environments communicate directly with the server computer 130 through one or more computing devices. In embodiments, the vulnerability data depicted in FIG. 1 is sent from one or more devices that are not part of the networked environments 120 or networked environment 110. For example, an external device for a networked environment may catalogue asset vulnerabilities in the networked environment and send the catalogued asset vulnerabilities to server computer 130.

Network 100 comprises a plurality of public internetworks providing connectivity between networked environment 110 and networked environments 120 and server computer 130. In an embodiment, network 100 may comprise a private point-to-point connection of a site to the server computer 130. For example, a client computing device located within networked environment 110 could use the public Internet to connect to server computer 130 to send vulnerability or configuration data or request times to remediate for asset vulnerabilities, but a private point-t-point connection may be provided for the assets in networked environment 110.

Networked environment 110 comprises an environment in which a plurality of assets 114 communicate over network 112. Network 112 may comprise one or more local networks, such as local area networks, through which assets 114 communicate. Assets 114 comprise one or more access points to network 112. Assets 114 may include physical devices with access to network 112, such as personal computers, workstations, laptop computers, netbook computers, smartphones, tablet computes, cameras, point of sale systems, or other devices capable of interacting over a network. Assets 114 may additionally include one or more virtual devices, such as cloud based servers or virtualization environments executing on local server computers.

Network environment 110 sends existing asset vulnerability data 116 to server computer 130 over network 100. Existing asset vulnerability data 116 comprises data identifying asset vulnerabilities of one or more assets 114 that have not been remediated or exploited in an attack. The asset vulnerabilities may include vulnerabilities based on installed software, internal or external network access, password information, or other vulnerabilities of the one or more assets 114 to attacks. The existing asset vulnerability data 116 may uniquely identify one or more asset vulnerabilities and/or may provide data through which server computer 130 may identify the asset vulnerabilities. For example, the existing asset vulnerability data 116 may identify software programs installed on different devices. The server computer 130 may store data identifying vulnerabilities with different programs, thereby allowing the server computer 130 to identify asset vulnerabilities for assets based on the software programs installed on each asset.

Networked environments 120 comprise a plurality of networked environments, each of which comprising a plurality of assets 124 that communicate over a network 122. The assets 124 and network type may differ among networked environments 120. For example, a first networked environment of networked environments 120 may comprise a plurality of point of sale systems, a server computer, and a client computing device, while a second networked environment comprises a plurality of smartphone devices, a plurality of desktop devices, and a database management system.

Networked environments 120 send resolved asset vulnerability data 126 to server computer 130 over network 100. Resolved asset vulnerability data 126 comprises data identifying asset vulnerabilities of one or more assets 124 that have been remediated or exploited in an attack. The resolved asset vulnerability data may be received directly from networked environments 120, from external sources, or a combination thereof. For example, networked environments 120 may send data identifying asset vulnerabilities that have been remediated while an external device identifies asset vulnerabilities that were exploited in an attack. The resolved asset vulnerability data 126 may additionally comprise timing data indicating an amount of time between identification of the asset vulnerability and resolution of the asset vulnerability through remediation or exploitation in an attack.

Server computer 130 comprises a platform configured to track software vulnerabilities for networked environments and/or provide times to remediate for software vulnerabilities. Server computer 130 may comprise an application programming interface (API) through which client computing devices and/or networked environments provide asset vulnerability data and/or configure computation of times to remediate for different software vulnerabilities.

Server computer 130 stores vulnerability data categorization instructions 132, vulnerability remediation computation instructions 134, and graphical user interface instructions 138. Each of data categorization instructions 132, vulnerability remediation computation instructions 134, and graphical user interface instructions 138 comprises a set of one or more pages of main memory, such as RAM, in the server computer 130 into which executable instructions have been loaded and which when executed cause the computer system to perform the functions or operations that are described herein with reference to those modules. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of vulnerability data categorization instructions 132, vulnerability remediation computation instructions 134, and graphical user interface instructions 138 also may represent one or more files or projects of source code that are digitally stored in a mass storage device such as non-volatile RAM or disk storage, in the server computer 130 or a separate repository system, which when compiled or interpreted cause generating executable instructions which when executed cause the computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the server computer 130.

Data categorization instructions 132 comprise computer-readable instructions which, when executed by one or more processors, cause the server computer 130 to identify a plurality of asset vulnerabilities in received asset vulnerability data to be identified as belonging to particular categories. For example, the server computer 130 may store data indicating, for each asset vulnerability, a category to which the asset vulnerability belongs. The category may be generated based on one or more subdivisions of the asset vulnerability data, as described further herein.

Vulnerability remediation computation instructions 134 comprises computer-readable instructions which, when executed by one or more processors, cause the server computer 130 to compute times to remediate for asset vulnerabilities within one or more categories according to one or more metrics, as described further herein. The times to remediate may be computed based on the resolved asset vulnerability data 126 for networked environments 120 and assigned to asset vulnerabilities in the existing asset vulnerability data 116 for networked environment 110.

Graphical user interface instructions 138 comprise computer-readable instructions which, when executed by one or more processors, cause the server computer 130 to cause display of a graphical user interface on a client computing device. The graphical user interface may depict times to remediate for a plurality of asset vulnerabilities in the existing asset vulnerability data 116. The graphical user interface may additionally include options for configuring computation of the times to remediate, such as through different metrics, configuring the categorization of asset vulnerabilities, updating or changing the existing asset vulnerability data 116, or otherwise updating or utilizing the times to remediate computed by server computer 130.

Remediation Computation

Figure 2:
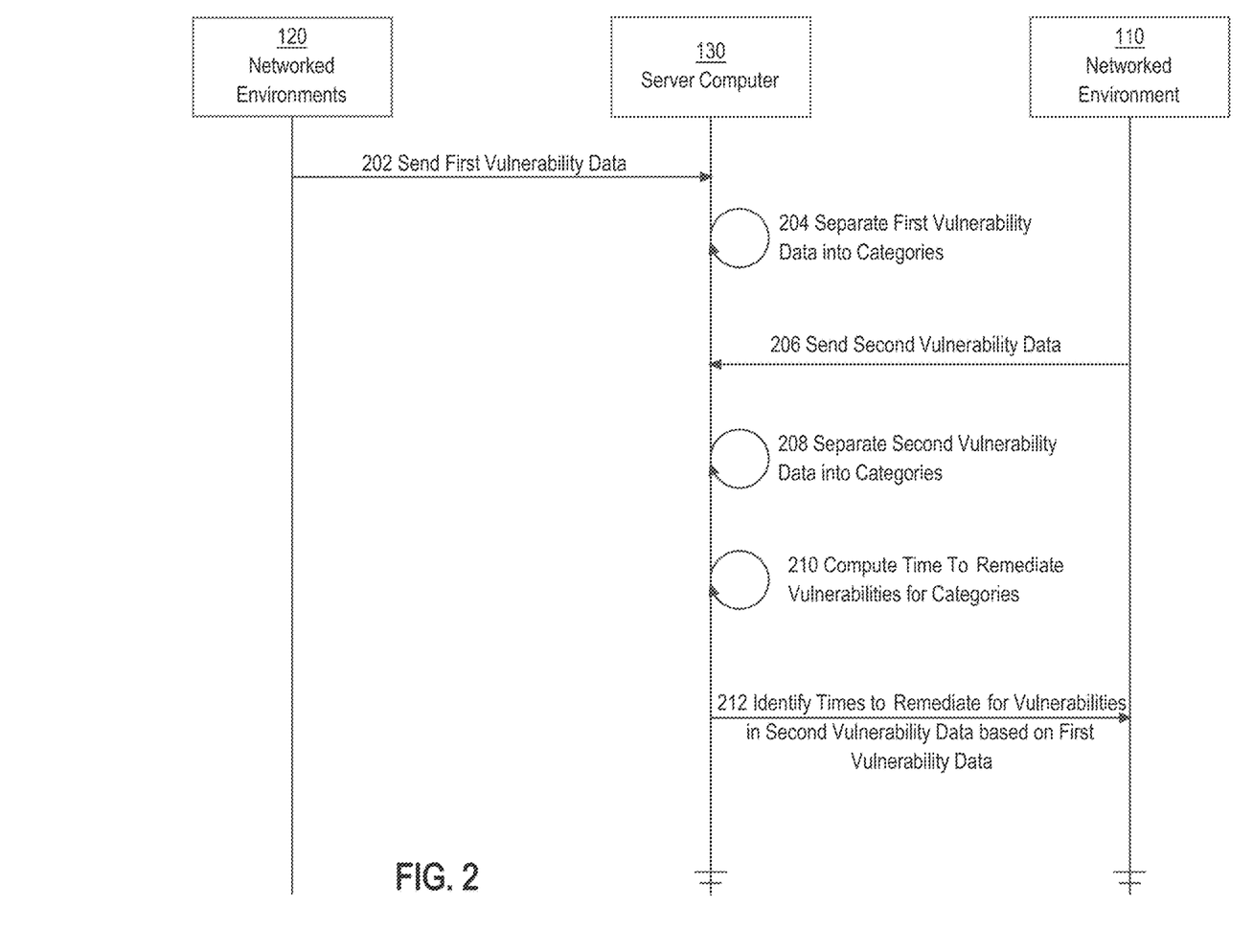
FIG. 2 depicts a method for computing times to remediate for a plurality of asset vulnerabilities.

FIG. 2 depicts a method for computing times to remediate for a plurality of asset vulnerabilities.

At step 202, networked environments 120 send first vulnerability data to server computer 130. The first vulnerability data comprises data identifying resolved asset vulnerabilities. A resolved asset vulnerability, as used herein, refers to an asset vulnerability that has been remediated, closed through degradation of the asset, otherwise removed, or used in an attack. Server computer 130 may additionally receive timing data corresponding to the first vulnerability data that indicates an amount of time between identification of the asset vulnerability and resolution of the asset vulnerability.

The first vulnerability data may comprise identifiers of a first plurality of asset vulnerabilities that existed within networked environments 120. The first vulnerability data may additionally include additional data relating to the plurality of asset vulnerabilities. Examples of additional data include an asset type, such as identifiers of server computers, desktop computers, laptop computers, registers, camera, security systems, virtual devices, or cellular telephones, an asset manufacturer or model number, an operator of the asset, software running on the asset, connectivity capabilities of the device such as purely internal network access or external network access, a priority assigned to the asset, a type of asset vulnerability, a likelihood of the asset vulnerability being exploited, or any other information relating to the asset or asset vulnerability.

In an embodiment, the additional data comprises a risk score for each of the asset vulnerabilities. The risk scores comprise metrics indicating severity of asset vulnerabilities. As an example, the Common Vulnerability Scoring System (CVSS) provides qualitative severity rankings for different software vulnerabilities. As another example, a risk score may be computed based on the first vulnerability data using the methods described in patent application Ser. No. 14/831,352, the entirety of which is incorporated by references as if fully set forth herein. Other examples include the exploit prediction scoring system (EPSS), Qualys Severity scores, Tenable Vulnerability Priority Rating (VPR), Recorded Future Vulnerability Scores, VulnDB Scores, and the Rapid 7 InsightVM scores. The risk score may additionally or alternatively comprise a computation of a likelihood that an asset vulnerability exists or that an asset vulnerability will be exploited. In an embodiment, priority values are computed for different assets based on additional data, such as a type of device, a type of operating system executing on the device, security applications executing on the device, owner of the device, network access of the device, or other device data.

In an embodiment, the first vulnerability data and the timing data are received over time through tracking of asset vulnerabilities for a plurality of networked environments 120. For example, for a particular networked environment, the server computer 130 may receive data indicating that an asset vulnerability has been discovered, such as through a ticket that is opened through a task tracking system. The server computer 130 may additionally receive data indicating that the asset vulnerability was resolved, such as closing of the ticket, removal of the asset from the system, or a new ticket indicating that the asset vulnerability was used in an attack. The server computer 130 may compute a time between discovery of the asset vulnerability and resolution of the asset vulnerability.

In an embodiment, the first vulnerability data and the timing data are received from an outside source other than the networked environment in which the vulnerabilities occurred. For instance, an alternative data source may provide vulnerability data and timing data for attacks that occurred through different asset vulnerabilities within different networked environments.

At step 204, server computer 130 separates first vulnerability data into a plurality of categories. The categories may be based on one or more of a risk score, a priority, a device type, network access, likelihood of exploitation of an asset vulnerability, type of asset vulnerability, or software running on the asset. As a practical example, if a particular type of risk score ranges from 0-100 for asset vulnerabilities, a first category may comprise all asset vulnerabilities with a risk score of 50 or lower, a second category may comprise all asset vulnerabilities with a risk score between 50 and 80, and a third category may comprise all asset vulnerabilities with a risk score between 80 and 100. As another example, if assets are labeled with priority levels of low, medium, and high, a first priority category may comprise all asset vulnerabilities with a priority level of low, a second priority category may comprise all asset vulnerabilities with a prior level of medium, and a third category may comprise all asset vulnerabilities with a priority level of high.

At step 206, networked environment 110 sends second vulnerability data to server computer 130. The second vulnerability data comprises data identifying existing asset vulnerabilities. An existing asset vulnerability, as used herein, refers to an asset vulnerability that has been identified, but has not been remediated, closed through degradation of the asset, otherwise removed, or used in an attack. Server computer 130 may additionally receive timing data corresponding to the second vulnerability data that indicates a time and/or day when the asset vulnerabilities were identified.

The second vulnerability data may comprise identifiers of a second plurality of asset vulnerabilities within networked environment 110. As with the first vulnerability data, the second vulnerability data may additionally include additional data relating to the plurality of asset vulnerabilities. The additional data for the second vulnerability data may comprise a same type of additional data as the additional data for the first vulnerability data. For example, if a particular type of risk score is received as additional data for the first plurality of asset vulnerabilities, the particular type of risk score may be received as additional data for the second plurality of asset vulnerabilities.

Additionally or alternative, variations of the types of information received for the first vulnerability data may be received for the second vulnerability data. For example, data relating to the assets may be received for the first vulnerability data and used to compute a priority level for each asset while pre-selected priority levels are received for the second vulnerability data, or vice versa with the first vulnerability data including pre-selected priority levels and the second vulnerability data comprising asset information that is used to compute priority levels.

At step 208, server computer 130 separates second vulnerability data into a plurality of categories. The plurality of categories for the second vulnerability data may correspond to the plurality of categories for the first vulnerability data. For example, if the first vulnerability data is split into risk categories, the second vulnerability data may be split into the same risk categories. The categories for the second vulnerability data may comprise variations of the categories for the first vulnerability data. For example, if the first vulnerability data included pre-selected priority levels, the second vulnerability data may include priority levels determined based on one or more factors. Thus, while the priority levels may comprise "low", "medium", and "high" for both the first vulnerability data and the second vulnerability data, the source of those category determinations may differ.

At step 210, server computer 130 computes times to remediate vulnerabilities for the categories. For example, the server computer 130 may compute an average of the amount of time between identification and resolution of the asset vulnerabilities in the first vulnerability data for each category. As a practical example, if a first category of asset vulnerabilities in the first vulnerability data includes only three asset vulnerabilities with a first having been resolved in five days, a second having been resolved in ten days, and a third having been resolved in fifteen days, the computed time to remediate vulnerabilities for that category may comprise ten days, the average of the three values. As an alternative, a more complicated equation may be used to compute the time to remediation, such as a fraction (e.g. 50%) of the average of amount of time between identification and resolution of the asset vulnerabilities in the first vulnerability data. Similarly, the determination for which timeframe is selected for each group can be made by selecting the median, mean, mode, or any percentile time to remediate within that subgroup as determined by the categories.

The time to remediate vulnerabilities may be computed separately for different types of resolution of the vulnerabilities. For example, a time to remediate may be computed for only a subset of the first vulnerability data where the resolution of the vulnerability was remediation. As another example, a time to remediate may be computed for only a subset of the first vulnerability data where the resolution of the vulnerability was the use of the vulnerability in an attack. Alternatively, multiple times to remediate may be computed using the subsets of the first vulnerability data. For example, a first time to remediate may be computed for asset vulnerabilities in a particular category of the first vulnerability data that were remediated and a second time to remediate may be computed for asset vulnerabilities in the particular category of the first vulnerability data that were exploited in an attack.

In an embodiment, the times to remediate computed for different types of resolution are based on different datasets. For example, a first dataset of the first vulnerability data may include asset vulnerabilities that were remediated while a second dataset of the first vulnerability data may include asset vulnerabilities that were exploited or otherwise used in an attack. The first and second dataset may include asset vulnerabilities for a same networked environment or environments or for different networked environments.

At step 212, server computer 130 identifies times to remediate for vulnerabilities in the second vulnerability data based on the first vulnerability data. For example, the server computer 130 may identify each asset vulnerability in the second vulnerability data that corresponds to a particular category and identify the time to remediate for said each asset vulnerability as the time to remediate that was computed for the particular category. Thus, if the average time to remediate asset vulnerabilities in a low risk category within the first vulnerability data is fifty days, then each asset vulnerability in the low risk category within the second vulnerability data may be assigned a time to remediate of fifty days.

Category Combinations

In an embodiment, combinations of multiple categories are used to compute the time to remediate based on the first vulnerability data. For example, given three subdivisions of risk level and three subdivisions of priority level, the server computer 130 may divide the first vulnerability data into nine different categories, with a first category comprising a low risk level and low priority level, a second category comprising a low risk level and a medium priority level, and so on. Combinations may additionally include more subdivision types, thereby providing even finer granularity to the identifications of times to remediate. For instance, with three subdivision types of three subdivisions each, twenty-seven times to remediate may be computed and applied to different asset vulnerabilities in the second vulnerability data based on the same or similar subdivisions in the second vulnerability data.

In an embodiment, the system computes times to remediate for different categories or combinations of categories according to a plurality of metrics. For example, the system may compute a time to remediate as an average of the amount of time between identification of the vulnerabilities and remediation of the vulnerabilities for a particular combination of categories, such as priority and risk level, a fraction of the average of the amounts of time between identification and remediation of the vulnerabilities, such as 50%, for the particular combination of categories, and an average of the amount of time between identification of the vulnerability and exploitation of the vulnerability in an attack.

In an embodiment where a plurality of metrics is used to compute the times to remediate for different categories or combinations thereof, a plurality of times to remediate may be assigned to each asset vulnerability. For example, a first time to remediate may be computed based on asset vulnerabilities within a category that were remediated while a second time to remediate may be computed based on asset vulnerabilities within the category that were exploited in an attack. Additionally or alternatively, a category determination for an asset vulnerability may be used to select a metric for computing the time to remediate. For example, if an asset vulnerability is low priority, the time to remediate may be computed based on time until a vulnerability was exploited in an attack, but if the asset vulnerability is medium priority, the time to remediate may be computed based on previous times to remediate. The categories used to select the metric for computing the time to remediate may be a same subdivision as the categories used to select asset vulnerabilities for the computation of the time to remediate or may be different categories. For example, the first vulnerability data may be subdivided into risk scores for the computation of the time to remediate, but the metric used to compute the time to remediate may be determined based on priority. As another example, the first vulnerability data may be subdivided into risk scores for the computation of the time to remediate, but the metric used to compute the time to remediate may be based on operating system of the asset the vulnerabilities were identified on.

In an embodiment, the plurality of subdivisions comprises risk scores as generated by different sources and/or through different metrics. For example, a first subdivision may comprise a plurality of categories based on risk scores computed by the server computer 130 while a second subdivision comprises an external risk score, such as the CVSS risk scores. The plurality of subdivisions combined as described herein, thereby creating, for example, a category comprising asset vulnerabilities that received a "low" internal risk score and "low" CVSS risk score. Additionally or alternatively, times to remediate may be computed separately for subdivisions based on different risk scores. For example, a first time to remediate may be computed based on asset vulnerabilities in the first vulnerability data which received a "low" internal risk score and a second time to remediate may be computed based on asset vulnerabilities in the first vulnerability data which received a "low" CVSS risk score.

Example Implementations

In an embodiment, the server computer 130 provides times to remediate through graphical user interfaces described herein. The server computer 130 may provide the times to remediate for individual asset vulnerabilities as they are discovered, periodically based on an audit of a networked environment, in response to a request for a client computing device to provide times to remediate for asset vulnerabilities, and/or may update times to remediate based on changing first vulnerability data in response to requests from a client computing device and/or periodically.

In an embodiment, the server computer 130 provides times to remediate in response to a request from a client computing device. The client computing device may send the second vulnerability data to the server computer 130 along with a request to compute times to remediate. Additionally or alternatively, the second vulnerability data may be provided by the networked environment corresponding to the second vulnerability data over time, such as through continuous tracking of networked devices or receipt of data from different networked devices. In response to receiving the request to provide times to remediate, the server computer 130 may separate the second vulnerability data into a plurality of categories comprising subdivisions, such as "low", "medium", "high" risk scores, or combination subdivisions, such as "low" risk, "low" priority and "high" risk, "high" priority. The server computer 130 may compute a time to remediate for each category based on the first vulnerability data and assign the time to remediate to each asset vulnerability of the second vulnerability data in said category and/or assign a pre-computed time to remediate for each category to each asset vulnerability of the second vulnerability data in said category.

In an embodiment, the server computer 130 provides detailed information for each asset vulnerability, such as the name of the asset, the type of vulnerability, a risk score, or a priority score. The server computer 130 may additionally provide the time to remediate for each asset vulnerability. An improved graphical user interface may include options for filtering asset vulnerabilities based on the times to remediate. In embodiments, the server computer 130 may generate task records indicating individual asset vulnerabilities and times to remediate the individual asset vulnerabilities.

The request to provide times to remediate may specify subdivisions for generating categories and/or metrics by which to compute the times to remediate. For example, the request may specify subdivisions based on risk score and priority. As another example, the request may specify computation of times to remediate using different metrics, such as based on times to remediate in the first vulnerability data or based on times to attack in the first vulnerability data. In some embodiments, the server computer 130 provides a graphical user interface through which a client computing device may configure the computation of times to remediate, such as selecting categories or metrics to be used to compute the times to remediate, specifying subsets of the second vulnerability data to be treated separately based on features of the asset vulnerabilities, such as by being separated into different categories or having the time to remediate be computed with different metrics, or specifying metrics to be used to compute times to remediate for different categories.

In an embodiment, the server computer 130 provides times to remediate periodically or in response to identifying new asset vulnerabilities based, at least in part, on configuration settings for a networked environment. For example, a client computing device may send configuration data to the server computer 130 identifying priority levels of different assets. If a new asset vulnerability is discovered, the server computer 130 may determine a risk level of the asset vulnerability and the priority level of the asset based on the configuration data. The server computer 130 may then determine a time to remediate for the new asset vulnerability using the methods described herein.

In an embodiment, the server computer 130 periodically updates times to remediate as first vulnerability data is received. As the times to remediate are computed based on the timing data for the first vulnerability data, new first vulnerability data with different timing data may change the computed times to remediate. The server computer 130 may be configured to compute times to remediate for different categories and store the times to remediate at the server computer 130. When a request for times to remediate are received, the server computer 130 may provide the pre-computed times to remediate for the different categories. Periodically, the server computer 130 may update the stored times to remediate by recomputing the times to remediate with updated vulnerability data. In an embodiment, updating the stored times to remediate comprises updating the times to remediate assigned to the second vulnerability data. Thus, if the time to remediate for a particular category decreases, the server computer 130 may update the time to remediate for asset vulnerabilities in the particular category. Additionally or alternatively, the server computer 130 may compute new times to remediate when a request is received, thereby utilizing most recently received data.

The times to remediate may be provided to a client computing device through improved graphical user interfaces, used to generate Service Level Agreements (SLAs), used to generate notifications, used to identify dates for remediation, and/or used to generate task records for remediation. In an embodiment, the server computer 130 generates prioritized views of asset vulnerabilities, indicating asset vulnerabilities with a lower time to remediate as having higher priority.

Example Improved Displays

In an embodiment, the server computer 130 provides improved displays to a client computing device identifying times to remediate for individual asset vulnerabilities of the second vulnerability data and/or for groups of asset vulnerabilities corresponding to categories of the second vulnerability data. The improved displays may be used to generate task records for performing remediation of asset vulnerabilities, configure or update data used to determine remediation of asset vulnerabilities, and/or may otherwise provide asset vulnerability remediation information in an improved and dynamic manner.

In an embodiment, an improved metric selection interface provides times to remediate for different categories corresponding to one or more subdivisions of the first vulnerability data. The improved selection interface may include options for selecting metrics by which to compute the time to remediate and/or different subdivisions.

Figure 3:
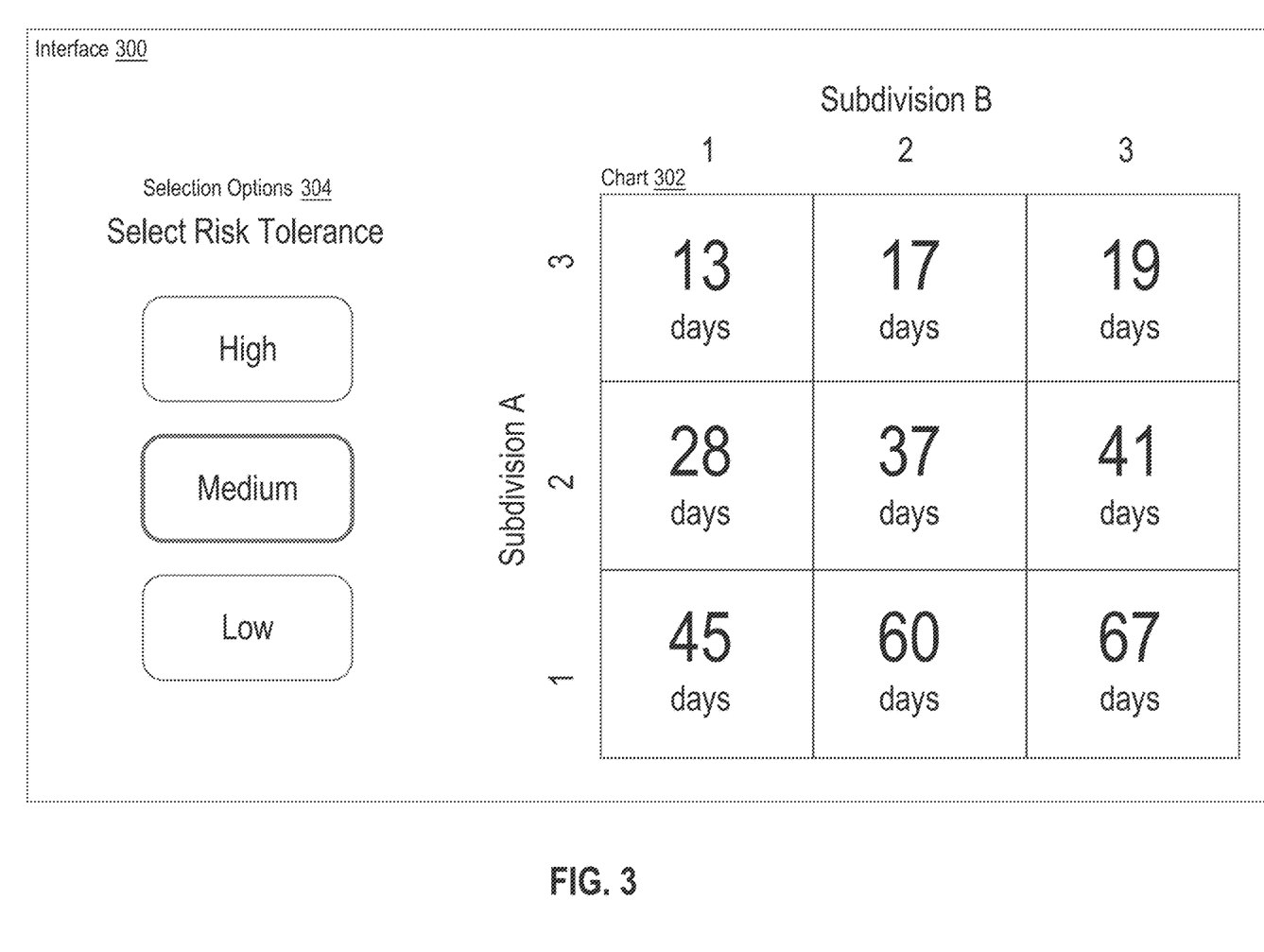
FIG. 3 depicts an example improved selection interface.

FIG. 3 depicts an example improved selection interface. Interface 300 comprises a graphical user interface displayed on a client device which includes time to remediate chart 302 and selection options 304. Time to remediate chart 302 identifies computed times to remediate for a plurality of categories. In interface 300, each category comprises a combination of two subdivisions, subdivision 1 and subdivision 2. Thus, asset vulnerabilities that fall into subdivision A1 and subdivision B1 are grouped into a same category with a computed time to remediate of 45 days. While FIG. 3 depicts two types of subdivisions with three subdivisions each, other embodiments may include a greater or fewer number of types of subdivisions and/or subdivisions of the different types.

Selection options 304 comprise one or more selectable options relating to the computation of the time to remediate. In interface 300, the selection options are identified as "Risk Tolerance" options with choices of High, Medium, and Low. In an embodiment, each option determines a metric by which the time to remediate is computed. For example, a High risk tolerance may correspond to a computation of an average time between identification of an asset vulnerability and exploitation of the asset vulnerability in an attack. A Medium risk tolerance may correspond to a computation of an average or median time between identification of an asset vulnerability and remediation of the asset vulnerability. A Low risk tolerance may correspond to a fraction of the Medium risk tolerance, such as half the average or median time between identification of the asset vulnerability and remediation of the asset vulnerability.

In an embodiment, the interface 300 is displayed on a client computing device in response to a request to produce times to remediate for the second vulnerability data. The server computer 130 may display interface 300 which provides a preview of the times to remediate that will be applied to the second vulnerability data based on the categories of asset vulnerabilities in the second vulnerability data. In response to receiving a selection of a different selection option 304, the server computer 130 may update chart 302 to depict times to remediate based on the selected metric.

In an embodiment, the server computer 130 additionally displays information indicating a number of asset vulnerabilities that would be placed in each category. By pre-identifying the categories for the second vulnerability data, the server computer 130 is able to provide a preview which identifies both the times to remediate under each risk tolerance level and a number of asset vulnerabilities that would be included under each category. By providing this information, the improved display is capable of providing dynamic information that can be adjusted to match a risk tolerance and/or available workload. Additionally, the ability to switch between times to remediate based on previous remediation versus times to remediate based on previous attacks provides improved information indicating differences in how certain assets vulnerabilities have been historically treated or exploited while indicating a relationship between those asset vulnerabilities and current asset vulnerabilities in a networked environment.

In an embodiment, the improved interface includes functionality for changing the subdivision types. For example, the interface may include a drop down menu for Subdivision A and/or Subdivision B with options for replacing the type of subdivision. As a practical example, a drop down menu may include options comprising a risk score computed by the server computer 130, a priority score computed by the sever computer, a provided priority score, one or more different risk scores computed using different algorithms or provided from different external sources, a type of device, a type of operating system, or a level of network access. In response to receiving a selection of one or more changes to the subdivisions, the server computer 130 may compute new times to remediate for the newly created categories and/or identify times to remediate for the categories and update chart 304 to depict the times to remediate. The server computer 130 may additionally update displayed data indicating a number of asset vulnerabilities in each category.

Figure 4:
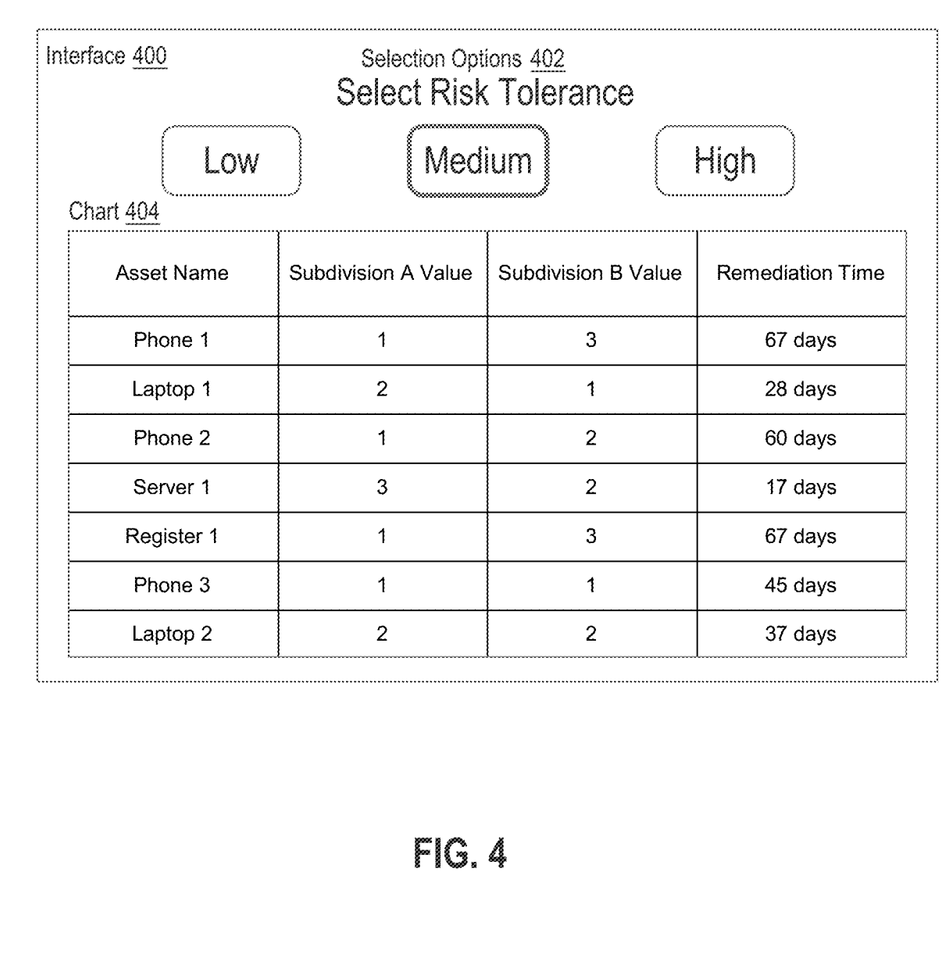
FIG. 4 depicts an example improved asset remediation display.

FIG. 4 depicts an example improved asset remediation display. Interface 400 comprises a graphical user interface displayed on a client computing device which includes selection option 402 and asset vulnerability chart 404. Interface 400 may be displayed in response to a selection and confirmation of a risk level in graphical user interface 300. Interface 400 may additionally or alternatively be displayed in response to a request to view times to remediate for a plurality of asset vulnerabilities. Thus, selection option 402 may comprise options for updating graphical user interface 400 with times to remediate computed with different metrics. Alternatively, interface 400 may include asset vulnerability chart 404 without selection options 402, which may be displayed in a separate interface.

Chart 404 depicts information relating to different asset vulnerabilities, including data identifying the asset vulnerability, values for the subdivisions and/or identifications of categories, and a selected time to remediate for each asset vulnerability. The times to remediate in chart 404 correspond to the times to remediate in chart 302 of FIG. 3 for the indicated subdivisions and risk tolerance. The chart 304 may include options to sort the asset vulnerabilities based on asset name, subdivision values, or remediation time. Additional data may be provided in chart 304 such as device type, username, or other information relating to the asset or asset vulnerability. Chart 304 may additionally include options for modifying an asset vulnerability, such as changing a subdivision value, changing a time to remediate, or applying a different metric to compute the time to remediate. In response to receiving a modification to an asset vulnerability, the server computer 130 may update chart 304 to indicate a new time to remediate determined using the methods described herein. In an embodiment, the chart 304 indicates times to remediate under different subdivision types and/or under different metrics for computing times to remediate.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
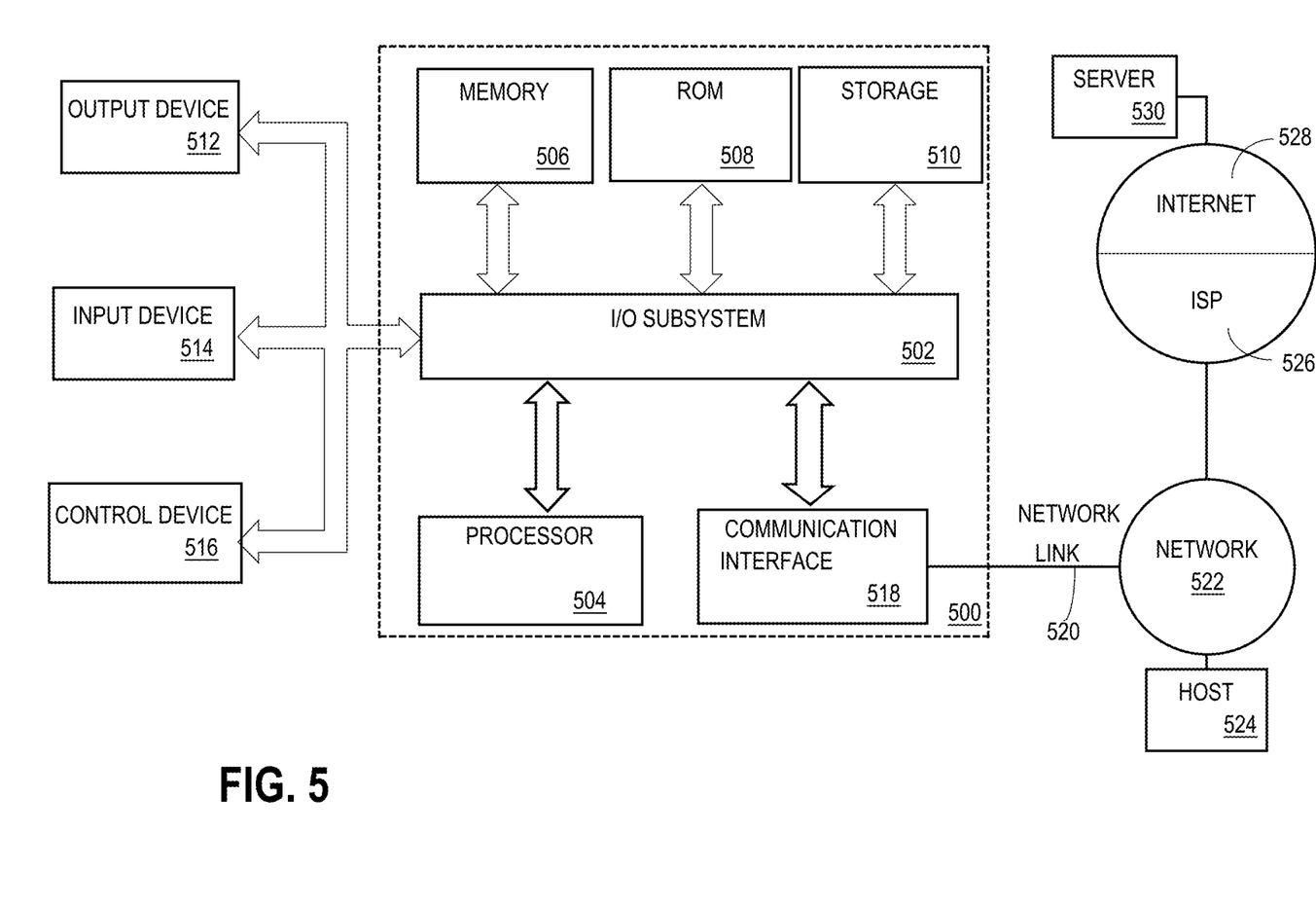
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A system comprising:
    one or more processors; and
    a memory storing instructions which, when executed by the one or more processors, causes performance of:
        receiving first vulnerability data for a plurality of entities identifying first asset vulnerabilities and timing data corresponding to the first vulnerability data, the timing data indicating an amount of time between identification of an asset vulnerability and a result of the asset vulnerability, wherein the first asset vulnerabilities represent resolved asset vulnerabilities;
        identifying a strict subset of the first vulnerability data that belongs to a particular category of a first plurality of categories;
        receiving second vulnerability data for a particular entity identifying second asset vulnerabilities;
        identifying a strict subset of the second vulnerability data that belongs to the particular category; and based, at least in part, on the strict subset of the first vulnerability data, computing a time to remediate the second asset vulnerabilities in the strict subset of the second vulnerability data.

2. The system of claim 1, wherein the result of the asset vulnerability comprises use of the asset vulnerability in an attack.

3. The system of claim 1, wherein the result of the asset vulnerability comprises remediation of the asset vulnerability and computing the time to remediate comprises computing an average of the amount of time between identification of the asset vulnerability and the remediation of the asset vulnerability for each asset vulnerability in the strict subset of the first vulnerability data.

4. The system of claim 1, wherein the result of the asset vulnerability comprises remediation of the asset vulnerability and computing the time to remediate comprises computing a particular fraction of an average of the amount of time between identification of the asset vulnerability and the remediation of the asset vulnerability for each asset vulnerability in the strict subset of the first vulnerability data.

5. The system of claim 1, wherein:
the result of the asset vulnerability comprises remediation of the asset vulnerability for a first plurality of asset vulnerabilities in the strict subset of the first vulnerability data and use of the asset vulnerability in an attack for a second plurality of asset vulnerabilities in the strict subset of the first vulnerability data, and
computing the time to remediate comprises computing a first time to remediate the asset vulnerability based on the amount of time between identification of the asset vulnerability and the result of the asset vulnerability for the first plurality of asset vulnerabilities and a second time to remediate the asset vulnerability based on the amount of time between identification of the asset vulnerability and the result of the asset vulnerability for the second plurality of asset vulnerabilities.

6. The system of claim 5, wherein the instructions, when executed by the one or more processors, further cause performance of:
receiving a request to display a time to remediate for the second vulnerability data based on remediation of the asset vulnerability for the strict subset of the first vulnerability data and, in response, causing displaying the first time to remediate for the strict subset of the second vulnerability data through a graphical user interface; and
receiving a request to display a time to remediate for the second vulnerability data based on use of the asset vulnerability in an attack for the strict subset of the first vulnerability data and, in response, updating the graphical user interface to cause displaying the second time to remediate for the strict subset of the second vulnerability data.

7. The system of claim 1, wherein the instructions, when executed by the one or more processors, further cause performance of:
identifying a second strict subset of the first vulnerability data that belongs to a second category of the first plurality of categories;
identifying a second strict subset of the second vulnerability data that belongs to the second category;
based, at least in part, on the second strict subset of the first vulnerability data, computing a time to remediate the asset vulnerabilities in the second strict subset of the second vulnerability data; and causing displaying, in a graphical user interface, the time to remediate the asset vulnerabilities in the strict subset of the second vulnerability data and the time to remediate the asset vulnerabilities in the second strict subset of the second vulnerability data.

8. The system of claim 1, wherein the first plurality of categories comprises categories determined by a risk score corresponding to asset vulnerabilities.

9. The system of claim 1, wherein the instructions, when executed by the one or more processors, further cause performance of:
identifying a second plurality of categories of asset vulnerabilities in the strict subset of the first vulnerability data and the strict subset of the second vulnerability data;
wherein computing the time to remediate the asset vulnerabilities in the strict subset of the second vulnerability data comprises computing a first time to remediate for a first category of the second plurality of categories of asset vulnerabilities and a second time to remediate for a second category of the second plurality of categories.

10. The system of claim 9, wherein the instructions, when executed by the one or more processors, further cause performance of:
identifying a second strict subset of the first vulnerability data that belongs to a second category of a first plurality of categories;
identifying a second strict subset of the second vulnerability data that belongs to the second category of the first plurality of categories;
identifying the second plurality of categories of asset vulnerabilities in the second strict subset of the first vulnerability data and the second strict subset of the second vulnerability data;
computing a time to remediate the asset vulnerabilities in the second strict subset of the second vulnerability data, computing the time to remediate the asset vulnerabilities in the second strict subset of the second vulnerability data comprising computing a third time to remediate for the first category of the second plurality of categories of asset vulnerabilities and a fourth time to remediate for the second category of the second plurality of categories; and
causing displaying a remediation grid comprising the first plurality of categories and the second plurality of categories, the remediation grid identifying a number of asset vulnerabilities in the second vulnerability data to be remediated within the first time, the second time, the third time, and the fourth time.

11. A method comprising:
receiving first vulnerability data for a plurality of entities identifying first asset vulnerabilities and timing data corresponding to the first vulnerability data, the timing data indicating an amount of time between identification of an asset vulnerability and a result of the asset vulnerability, wherein the first asset vulnerabilities represent resolved asset vulnerabilities;
identifying a strict subset of the first vulnerability data that belongs to a particular category of a first plurality of categories;
receiving second vulnerability data for a particular entity identifying second asset vulnerabilities;
identifying a strict subset of the second vulnerability data the belongs to the particular category; and based, at least in part, on the strict subset of the first vulnerability data, computing a time to remediate the second asset vulnerabilities in the strict subset of the second vulnerability data.

12. The method of claim 11, wherein the result of the asset vulnerability comprises use of the asset vulnerability in an attack.

13. The method of claim 11, wherein the result of the asset vulnerability comprises remediation of the asset vulnerability and computing the time to remediate comprises computing an average of the amount of time between identification of the asset vulnerability and the remediation of the asset vulnerability for each asset vulnerability in the strict subset of the first vulnerability data.

14. The method of claim 11, wherein the result of the asset vulnerability comprises remediation of the asset vulnerability and computing the time to remediate comprises computing a particular fraction of an average of the amount of time between identification of the asset vulnerability and the remediation of the asset vulnerability for each asset vulnerability in the strict subset of the first vulnerability data.

15. The method of claim 11, wherein:
the result of the asset vulnerability comprises remediation of the asset vulnerability for a first plurality of asset vulnerabilities in the strict subset of the first vulnerability data and use of the asset vulnerability in an attack for a second plurality of asset vulnerabilities in the strict subset of the first vulnerability data, and
computing the time to remediate comprises computing a first time to remediate the asset vulnerability based on the amount of time between identification of the asset vulnerability and the result of the asset vulnerability for the first plurality of asset vulnerabilities and a second time to remediate the asset vulnerability based on the amount of time between identification of the asset vulnerability and the result of the asset vulnerability for the second plurality of asset vulnerabilities.

16. The method of claim 15, further comprising:
receiving a request to display a time to remediate for the second vulnerability data based on remediation of the asset vulnerability for the strict subset of the first vulnerability data and, in response, causing displaying the first time to remediate for the strict subset of the second vulnerability data through a graphical user interface; and
receiving a request to display a time to remediate for the second vulnerability data based on use of the asset vulnerability in an attack for the strict subset of the first vulnerability data and, in response, updating the graphical user interface to cause displaying the second time to remediate for the strict subset of the second vulnerability data.

17. The method of claim 11, further comprising:
identifying a second strict subset of the first vulnerability data that belongs to a second category of the first plurality of categories;
identifying a second strict subset of the second vulnerability data that belongs to the second category;
based, at least in part, on the second strict subset of the first vulnerability data, computing a time to remediate the asset vulnerabilities in the second strict subset of the second vulnerability data; and
causing displaying, in a graphical user interface, the time to remediate the asset vulnerabilities in the strict subset of the second vulnerability data and the time to remediate the asset vulnerabilities in the second strict subset of the second vulnerability data.

18. The method of claim 11, wherein the first plurality of categories comprises categories determined by a risk score corresponding to asset vulnerabilities.

19. The method of claim 11, further comprising:
identifying a second plurality of categories of asset vulnerabilities in the strict subset of the first vulnerability data and the strict subset of the second vulnerability data;
wherein computing the time to remediate the asset vulnerabilities in the strict subset of the second vulnerability data comprises computing a first time to remediate for a first category of the second plurality of categories of asset vulnerabilities and a second time to remediate for a second category of the second plurality of categories.

20. The method of claim 19, further comprising:
identifying a second strict subset of the first vulnerability data that belongs to a second category of a first plurality of categories;
identifying a second strict subset of the second vulnerability data that belongs to the second category of the first plurality of categories;
identifying the second plurality of categories of asset vulnerabilities in the second strict subset of the first vulnerability data and the second strict subset of the second vulnerability data;
computing a time to remediate the asset vulnerabilities in the second strict subset of the second vulnerability data, computing the time to remediate the asset vulnerabilities in the second strict subset of the second vulnerability data comprising computing a third time to remediate for the first category of the second plurality of categories of asset vulnerabilities and a fourth time to remediate for the second category of the second plurality of categories; and
causing displaying a remediation grid comprising the first plurality of categories and the second plurality of categories, the remediation grid identifying a number of asset vulnerabilities in the second vulnerability data to be remediated within the first time, the second time, the third time, and the fourth time.

* * * * *